April 13, 1965  K. DABERKOW  3,177,816
APPARATUS FOR TRANSPORTING GOODS
Filed July 9, 1963  4 Sheets-Sheet 1
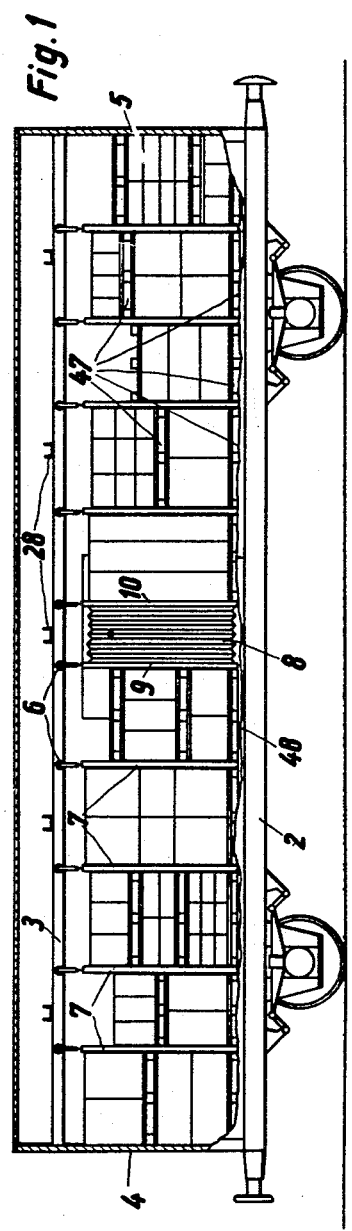
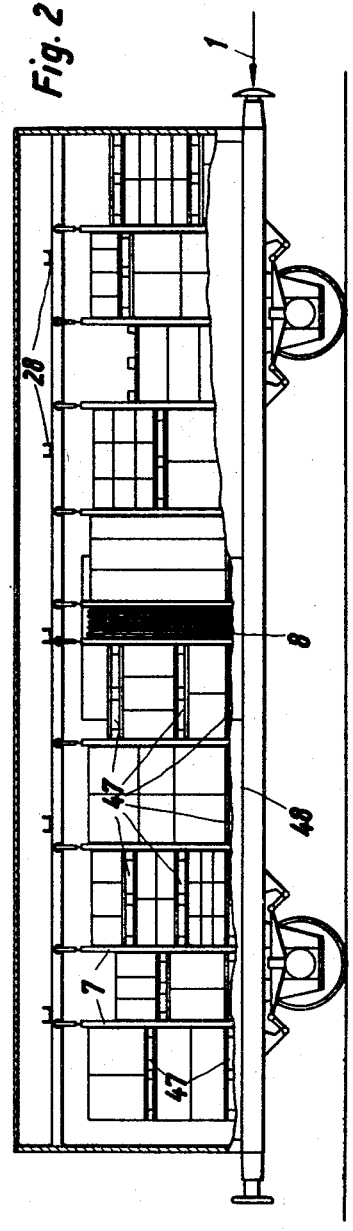
Inventor:
Kurt Daberkow
by
Michael S. Striker
Atty April 13, 1965    K. DABERKOW    3,177,816
APPARATUS FOR TRANSPORTING GOODS
Filed July 9, 1963    4 Sheets-Sheet 2

Inventor:
Kurt Daberkow
by
Michael S. Striker
Atty

April 13, 1965   K. DABERKOW   3,177,816
APPARATUS FOR TRANSPORTING GOODS
Filed July 9, 1963   4 Sheets-Sheet 3
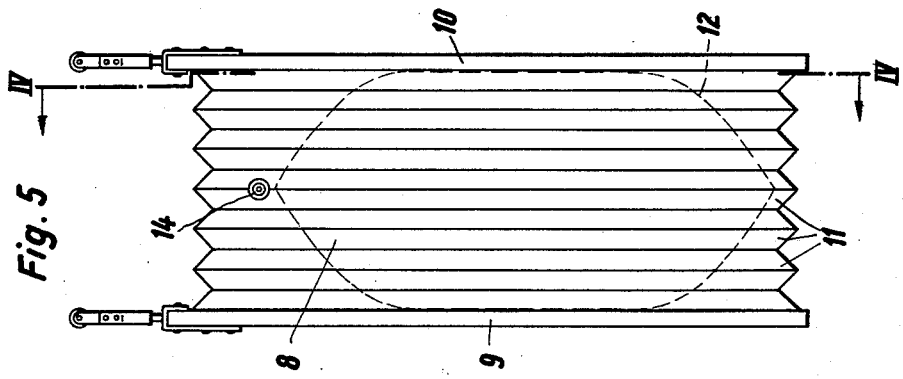
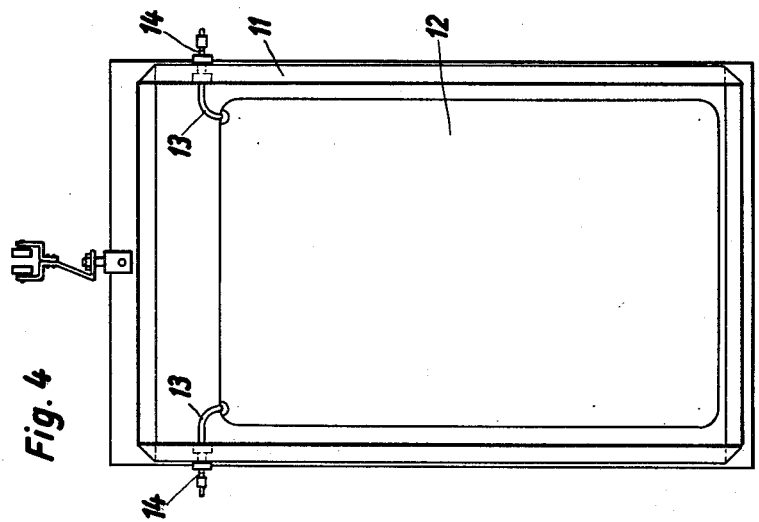
Inventor:
Kurt Daberkow
by
Michael J. Striker
Atty April 13, 1965  K. DABERKOW  3,177,816
APPARATUS FOR TRANSPORTING GOODS
Filed July 9, 1963
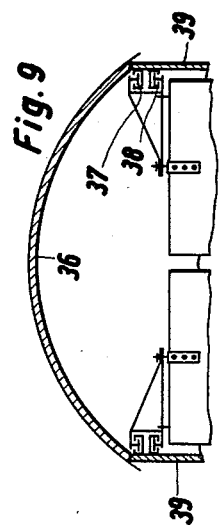
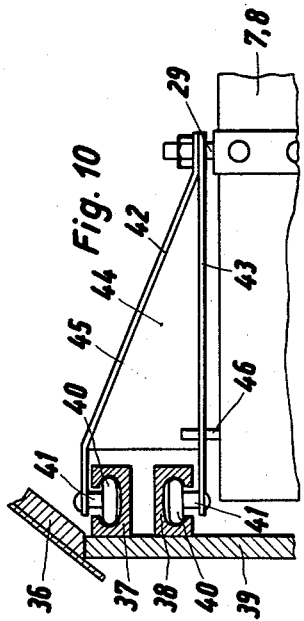
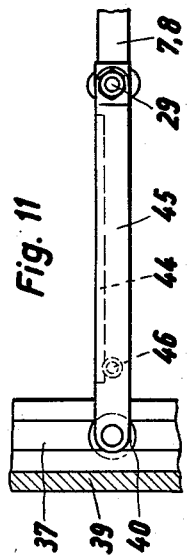
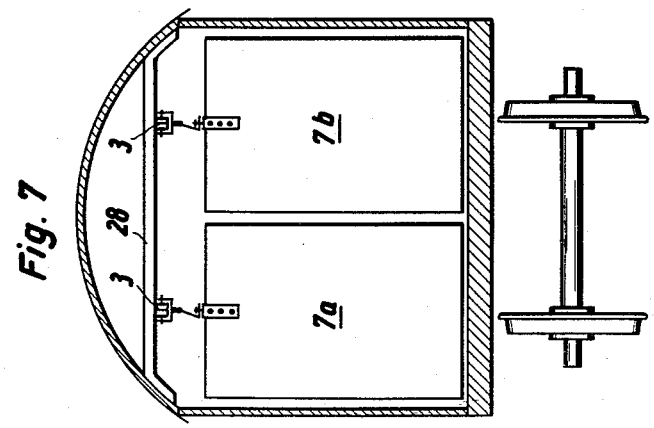
Inventor:
Kurt Daberkow
by
Michael J. Striker

United States Patent Office 3,177,816
Patented Apr. 13, 1965

3,177,816
APPARATUS FOR TRANSPORTING GOODS
Kurt Daberkow, Hamburg-Altona, Germany, assignor to Rheinstahl Siegener Eisenbahnbedarf G.m.b.H., Dreis-Tiefenbach, Germany
Filed July 9, 1963, Ser. No. 293,800
Claims priority, application Germany, July 14, 1962, D 39,376
14 Claims. (Cl. 105—369)

The present invention relates to transporting apparatus.

In particular, the present invention relates to apparatus for transporting goods in vehicles such as the cars of a freight train, for example.

When transporting goods in vehicles, there is always the problem of preventing damage to the goods which results from shocks encountered during sudden starting and stopping of the vehicle. For example, in the case of freight cars, such as are used in railroad trains, it is common practice to switch such cars along railroad tracks during the assembling of the cars into a particular train, and during such switching the sudden starting and stopping of the freight cars is such as to cause an undesirably large amount of damage to goods in the freight cars unless special measures are taken to prevent such damage.

Although there are many devices available for the purpose of taking care of this problem, these devices have not proved to be satisfactory. For example, it is well known to anchor the goods within the freight car or the like so that the goods are immovable with respect to the vehicle. For example the goods may be nailed directly to the vehicle or suitable rigid beams may be provided to rigidly retain the goods in a condition where it cannot move relative to the vehicle. However, the result of this sort of construction is that when fairly powerful shocks are encountered the goods simply breaks or the structure designed to hold the goods rigid with respect to the vehicle breaks, and it has been found in practice that measures of this type do not provide a satisfactory solution to the problem. Moreover, while it is known to locate in a vehicle of the above type yieldable resilient devices to absorb the shocks, these devices are subject to loss because they easily become displaced and also they are easily torn or otherwise damaged, so that these devices also fail to provide a satisfactory solution to the problem.

It is accordingly a primary object of the present invention to provide a structure which will provide a far greater protection to the goods than was heretofore attainable even when encountering relatively powerful shocks.

It is also an object of the present invention to provide a structure which is highly flexible in that it can adapt itself to loads of widely different types while at the same time protecting even relatively loose goods located at the upper part of the load by limiting the extent to which such loose goods can move.

Also, it is an object of the present invention to provide a structure which can receive loads mounted on pallets so that it is a simple matter to quickly load and unload, with the use of conventional fork-lift trucks, when using the apparatus of the invention.

It is furthermore an object of the present invention to provide a structure which adapts itself to the particular requirements of the vehicle so that, for example, it is possible with the structure of the invention to unload a vehicle through the roof thereof, if necessary.

It is furthermore an object of the present invention to provide for a structure of the above type a yieldable resilient means which will very greatly protect the load.

The objects of the present invention also include the provision of a structure which does not rigidly hold any of the goods so that it is immovable with respect to the vehicle but which rather holds the goods in such a way that it is capable of yielding when relatively large shocks are encountered.

With the above objects in view the invention includes, in an apparatus for transporting goods, an outer wall means which forms part of the vehicle and which defines a goods-receiving chamber. A rail means is located in this chamber and extends between a pair of opposed ends thereof. A plurality of inner walls are supported by this rail means for free movement along the interior of the chamber, this plurality of inner walls being supported exclusively by the rail means and remaining at all times connected only to the rail means so that this plurality of inner walls are at all times free to move relative to the outer wall means. A yieldable resilient means is located between a pair of these inner walls to urge them apart from each other so as to compress, between the ends of the chamber, goods located between at least some of the plurality of inner walls. This resilient means is the only agency which resists movement of the goods in the chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagrammatic, longitudinal, sectional elevation of a freight car provided with the structure of the present invention;

FIG. 2 shows what happens when the structure of FIG. 1 is subjected to a relatively severe shock;

FIG. 4 is a transverse sectional view showing part of the resilient yieldable structure of the invention, FIG. 4 being taken along line IV—IV of FIG. 5 in the direction of the arrows;

FIG. 5 is a side elevation of the structure of FIG. 4;

FIG. 7 is a transverse sectional view illustrating diagrammatically a freight car which houses an embodiment different from that of FIGS. 1–3;

FIG. 9 is a schematic transverse fragmentary illustration of another embodiment of the structure of the invention, the structure of FIG. 9 being adapted to be used where loading and unloading is through the roof of the vehicle;

FIG. 10 is a fragmentary sectional view on an enlarged scale of the rail and supporting structure of FIG. 9; and FIG. 11 is a top plan view of the structure of FIG. 10.

Figure 3:
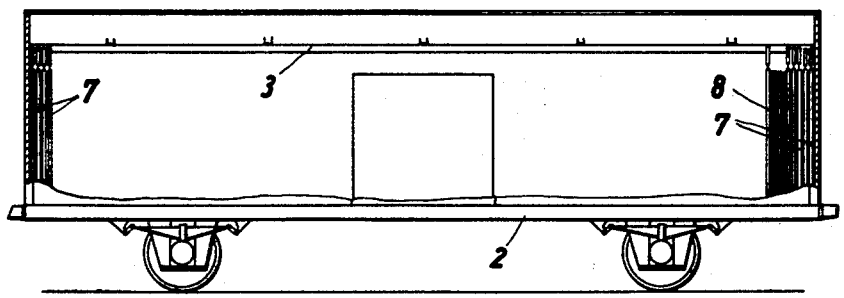
FIG. 3 is a diagrammatic side elevation of the empty freight car.

Referring now to the drawings and to FIG. 1 in particular, it will be seen that there is illustrated in FIG. 1 a conventional freight car 2 which has an outer wall means which defines a goods-receiving chamber the interior of which is visible in FIG. 1. The end walls 4 and 5 of this outer wall means of the vehicle 2 are shown in FIG. 1 while only one of the elongated side walls which extends between these end walls is visible in FIG. 1, and of course the roof as well as the floor are also visible in FIG. 1.

The outer wall means carries in its interior an elongated rail means 3 which may be supported either from the roof or from the side walls and which extend all the way along the length of the vehicle from the end wall 4 to the end wall 5. A plurality of rollers 6 are capable of rolling freely long the rail 3 and these rollers 6 form parts of support assemblies which support, respectively, a plurality of inner walls 7, 9 and 10. These inner walls 7, 9 and 10 are thus supported for longitudinal movement along the freight car by movement of the rollers 6 along the rail 3, and in addition the supports of which the rollers 6 form a part support the several inner walls 7, 9 and 10 for swinging movement freely about vertical axes, respectively, which are substantially parallel to the side and end walls of the outer wall means which defines the goods-receiving chamber shown in FIG. 1. Thus, each of the inner walls is capable of moving freely along substantially the entire length of the car while at the same time being freely swingable about a vertical axis, and of course it is the roller 6 which provides the possibility of free movement of the inner walls along the rail 3. It will be noted that the inner walls 9 and 10 are situated between the other inner walls 7 and are interconnected by a collapsible and expandable bellows 8, and within the space which is surrounded by the bellows 8 is located a yieldable resilient means which urges the walls 9 and 10 apart from each other. It will be noted that the goods is arranged in spaces between the several inner walls, with the exception of the space between the inner walls 9 and 10, so that when the yieldable resilient means within the bellows 8 urges the walls 9 and 10 apart from each other all of the goods is compressed between the end walls of the car. A particular feature of the invention resides in supporting the inner walls exclusively by way of the rail 3 and providing absolutely no other connection between these walls and the freight car so that the walls 7 as well as the walls 9 and 10 will assume whatever positions are dictated by the goods which they engage as well as the forces which might be encountered during movement of the vehicle as well as during packing thereof.

Figure 6:
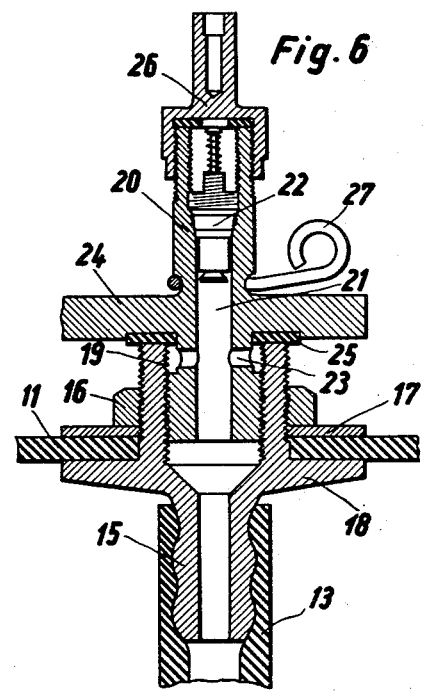
FIG. 6 shows in an enlarged, detailed, sectional view the structure of a valve which forms part of the assembly illustrated in FIGS. 4 and 5.

As is apparent from FIG. 5 in particular, the bellows means 8 is made up of a plurality of mutually foldable wall portions 11 which extend between and are connected to the pair of inner walls 9 and 10, and the yieldable resilient means in the illustrated example takes the form of an expandable air cushion 12 which is located in the space surrounded by the bellows 8. Thus, in the illustrated example a pneumatic means provides the yieldable resilient structure. As may be seen not only from FIG. 5 but also from FIGS. 4 and 6 the air cushion 12 is connected to and communicates with a pair of tubes 13 which extend up to suitable valve structures one of which is shown in detail in FIG. 6. Thus, the free end of each tube 13 which is distant from the air cushion 12 is connected with the tubular portion 15 of a flanged tubular member 18 which engages a wall portion 11 at its inner surface and extends through an opening of the wall portion to receive the nut 16 which is threaded onto an exteriorly threaded surface of the flanged tubular member 18 with a suitable washer 17 clamped between the exterior surface of the wall 11 and the nut 16 so that in this way the flanged tubular member 18 is reliably fixed to the bellows while passing through the wall thereof. The flanged tubular member 18 is also provided with an inner thread 19 which receives the valve housing 20 which is threaded into the threaded portion 19 of the member 18 in the manner illustrated in FIG. 6. This elongated valve housing 20 is formed with an axial bore 21 passing therethrough and within this axial bore 21 is situated a conventional valve assembly 22 which is precisely the same type of valve assembly as is located in the inner tubes of the tire of a motor vehicle. Thus, the valve assembly 22 is threaded into an interior threaded portion of the tubular housing 21 and this valve assembly 22 is capable of cooperating with any suitable source of compressed air for admitting the compressed air into the cushion 12 through the elements 21 and 18 as well as the tube 13, and of course the removable valve assembly 22 is in the form of a non-return valve preventing air from escaping unless the valve member is pushed inwardly in opposition to the spring which acts thereon, as is well known in the art. In addition, as is also conventional with automobile tires, the elongated tubular valve housing 20 is provided with an exterior thread receiving a cap 26 which serves further to guarantee that no air escapes.

The elongated tubular valve housing 21 is formed at a portion thereof which is located adjacent the outer end of the tubular member 18 with a transverse bore 23, and it will be noted that this transverse bore 23 is situated at a part of the member 20 whose outer diameter is smaller than the inner diameter of the tubular member 18 at its portion which is provided with the inner thread 19, so that the bore 21 communicates through the bores 23 with the space which surrounds the member 20 at the place where the bore 23 is located. The tubular member 20 is provided with an annular flange 24 which may have a knurled exterior surface so that the operator can engage the flange 24 in order to manually turn the entire housing 20 relative to the flanged tubular member 18, and it will be noted that a sealing ring 25 is situated between the outer end face of the tubular member 18 and the flange 24. A wire member 27 is secured to the exterior of the housing 20 in a groove thereof and is provided with an eye to which an unillustrated chain or the like may be connected so that by fastening this chain to a suitable member it is possible to prevent loss of the member 20 and the parts carried thereby.

When it is desired to expand the yieldable resilient means 12 the cap 26 is removed and air under pressure is introduced into the pneumatic means 12 until the desired pressure is attained. When it is desired to release the pressure then the operator need only engage the flange 24 and unscrew the assembly 20 so that the air can freely escape through the exterior through the tube 13, the member 18, the bore 21, the bore 23, and the space which is now provided between the flange 24 and the end of the tubular member 18, so that in this way it is possible to very quickly release the air from the cushion 12.

The inner walls 7 as well as the inner walls 9 and 10 can have a configuration corresponding approximately to the configuration of the cross section of the interior of the freight car transversely thereof, between the side walls, so that the interior can be divided up into chambers as shown in FIG. 1 each of which is located between a pair of successive inner walls except for the end chambers which are limited by the end walls 4 and 5, and of course the space between the inner walls 9 and 10 is occupied by the yieldable resilient means described above. However, it is also possible, as indicated in FIG. 7, to provide a structure where each inner wall extends only approximately one half of the way across the interior of the goods-receiving chamber. In this case a pair of rail means 3 extend longitudinally of the vehicle with the distance between the pair of rails 3 being approximately equal to the width of each of the inner walls 7a, 7b while the distance between each side wall and the adjoining rail 3 is equal approximately to one half of the width of the inner walls 7a, 7b. These inner walls are arranged along the length of the chamber precisely as shown in FIG. 1 for the walls 7, 9 and 10, and the row of inner walls 7a are provided with their own resilient means corresponding to the means situated between the walls 9 and 10 while this construction is duplicated for the walls 7b so that the interior of the freight car is longitudinally divided into substantially equal longitudinal halves each of which can be individually packed without having the arrangement of goods therein influenced by the arrangement of goods in the other half of the interior of the vehicle so that with this arrangement an extremely flexible packing is made possible. The supports for the several inner walls 7a, 7b are identical with those described above for the walls 7 and each of the walls 7a, 7b is capable of swinging about a vertical axis as well as moving freely along the interior of the car by way of the rails 3. It will be noted particularly from FIG. 7 that the walls 7a, 7b are supported exclusively from the rails 3 and otherwise remain unconnected to any other structure, in accordance with the present invention.

As is apparent from FIG. 7 any of the walls of one row can move freely past the walls of the other row without contacting the latter, and in addition because the size of the inner walls is reduced by approximately one half, as compared to the inner walls 7 of FIG. 1, the inner walls of FIG. 7 are much easier to move because of their smaller weight.

Figure 8:
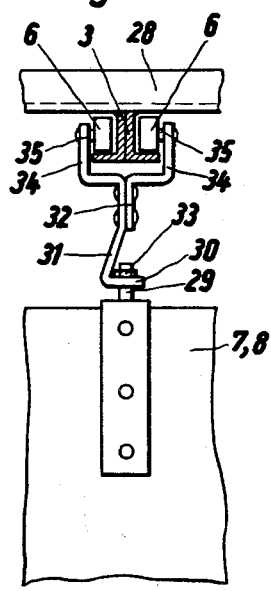
FIG. 8 is a partly sectional illustration of details of the supporting structure of the invention.

FIG. 8 illustrates the details of the rail means and the support members which carry the inner walls. Thus, as may be seen from FIG. 8 the transverse members 28 fixedly carry a pair of elongated angle members which may be welded to the members 28, for example, and which are of L-shaped cross section so that when the vertical walls of these angle members are placed together, as shown in FIG. 8, the horizontal walls thereof provide an assembly, with the vertical walls, of T-shaped cross section, and the inverted T-shaped cross section of the rail 3 is clearly apparent from FIG. 8. As a result of this construction the rail means 3 has a pair of lower flange portions on which the pair of rollers 6 of each of the support assemblies is capable of freely rolling. The support assembly includes a substantially U-shaped member 32 assembled from metal bar members, as illustrated in FIG. 8, for example, and this U-shaped member 32 has a pair of legs 34 fixedly carrying pins 35 on which the rollers 6 are respectively turnable. In addition, each member 32 has a downwardly extending portion 31 terminating in a substantially horizontal wall portion 30 formed with an opening through which the bolt 29 passes, this bolt being fixed to the upper edge of the inner wall 7, or the inner wall 8 or 9, the structure of FIG. 8 being identical for each of the inner walls, and the threaded top end portion of the bolt 29 carries a nut 33 which rests on the horizontal wall portion 30, so that in this way the support assembly of FIG. 8 not only supports each of the end walls for free movement along the rail 3 but also for swinging movement about the axis of the pin 29.

In the event that the vehicle is of the type which is to be loaded and unloaded through the roof and is provided with shiftable roof sections for this purpose, then the structure shown in FIGS. 9–11 may be used. In this case the space beneath the roof 36, which is only diagrammatically illustrated, is completely free and is in no way obstructed as it might be by the transverse members 28 shown in FIG. 7, for example. The rail means of this embodiment are carried by the side walls 39 which form with the end walls 4 and 5 of FIG. 1 part of the outer wall means which defines the goods-receiving chamber shown in FIG. 1. The pair of rail means which are respectively carried by the walls 39 shown in FIG. 9 are each composed of a pair of individual rails 37 and 38 extending entirely along the length of the car and fixedly carried by one of the side walls thereof. As is apparent from FIG. 10 the rails 37 and 38 of each rail means are identical but are directed in opposite directions so that the upper rail 37 opens upwardly while the lower rail 38 opens downwardly. As is apparent from FIG. 10 these rails are hollow and have interior hollow portions of substantially oval cross section communicating with the exterior through openings at a base of the rail, the opening of the rail 37 being at the top face thereof and the opening of the rail 38 being at the bottom face thereof, as indicated in FIG. 10. The support means of this embodiment, for supporting the inner walls, includes rollers 40 of generally oval cross section freely turnable within the hollow rails 37 and 38 and carried by pins 41, respectively, which are fixed to the bars 42 and 43, as shown most clearly in FIG. 10. In order to render the assembly of bars 42 and 43 rigid a substantially triangular plate 45 is located in the space between the bars 42 and 43 and is fixed thereto as being welded thereto, so that a substantially triangular support 44 which is quite rigid is freely movable along the rail means fastened to a side wall 39, and at its right end, as viewed in FIG. 10, which is to say the free end distant from the rail means, the support 44 carries the bolt 29 which may be identical with that shown in FIG. 8. In addition, with this embodiment the bar 43 is formed with an opening through which a pin 46 passes, this pin being fixed to the inner wall 7, or the inner walls 9 and 10 where the structure of FIGS. 9–11 is used, so that in this way the inner wall cannot have any swinging relative to the support 44. However, the entire support 44 can swing about the common axis of the pins 41 relative to the rails 37 and 38, so that in this way with the embodiment of FIGS. 9–11 it is also possible for the inner walls to swing about vertical axes. As is apparent from FIG. 9 the arrangement, in addition to leaving the space beneath the roof 36 absolutely clear has the advantages of the arrangement of FIG. 7 in that the inner walls each extend only approximately half way across the interior of the chamber and are thus much easier to move and provide a far more flexible assembly than a construction where the inner walls each extend substantially completely across the interior of the car.

Assuming that the vehicle is empty and that it is desired to load the same with goods, then all of the inner walls will intitally be displaced toward one end of the car. The empty car is illustrated in FIG. 3 with some of the inner walls situated at both ends of the empty car, so that if it were decided to load the car starting at the left end, as viewed in FIG. 3, those inner walls shown in FIG. 3 at the left end thereof would be moved to the right end so that free access could be had to the end wall 4 of the car. The car can be loaded by way of a fork-lift truck which engages a pallet on which the goods are situated, and one or more of these pallets with the goods thereon may be stacked next to the wall 4, in this particular example, whereupon one of the inner walls 7 is shifted into place so as to engage the goods which occupy along the length of the car a space whose longitudinal dimension is equal to the length of the pallet. Then the space to the right of the leftmost inner wall 7 of FIG. 1 is loaded in the same way, and the next inner wall 7 is moved into place against the goods, and in this way the loading proceeds until somewhat less than half of the car is loaded. Then the remaining inner walls are all shifted to the left next to the already loaded portion of the car, and the loading proceeds in the same way with the right part of the car until the car is filled almost to the central portion thereof. It is finally filled to the extent indicated, for example, in FIG. 1, where only the pair of inner walls 9 and 10 with the yieldable, compressible means therebetween situated in alignment with the central door of the car. Now the movement of goods into the car will be terminated and compressed air from any suitable source is supplied through the structure described above in connection with FIG. 6 to the air cushion 12 which expands so as to expand the bellows and press the inner walls 9 and 10 against the goods at the central portion of the car in a manner shown in FIG. 1, and it is to be noted that these walls 9 and 10 are of substantially the same construction as the remaining inner walls 7. All of these inner walls are made of a thick, wear-resistant sheet material which cannot be easily penetrated by the corners of containers, or the like, so that in this way the inner walls 9 and 10 reliably protect the pneumatic means from being damaged. At the same time, because the inner walls are swingable about the vertical axes, respectively, as described above and because they are somewhat flexible they easily adapt themselves to the space occupied by the load, so that in this way the goods can be compressed against each other with substantially no free spaces into which the goods can move.

In the event that it is desired not to fill the car completely, then it is possible to arrange a stack of pallets between a pair of the inner walls so that in this way the space can be easily and conveniently filled.

As has been indicated above, the inner walls are supported only from the rails and are otherwise completely unconnected to any structure. Furthermore, the yieldable resilient means 12 forms the only agency which resists movement of the goods in the vehicle. As consequence, if the vehicle should encounter a sudden shock of relatively large magnitude, the structure will behave as illustrated in FIG. 2, for example. Thus, assuming that the vehicle is travelling to the right, as viewed in FIG. 2, and suddenly comes to a stop as by encountering something which acts on the vehicle in the direction of the arrow 1 shown at the lower right of FIG. 2, then it is possible for the goods in the car to shift freely to the right compressing the yieldable means from its condition shown in FIG. 1 to its condition shown in FIG. 2, and because of the free yieldability of the inner walls 7 and the yieldability of the resilient means 12 such movement of the goods relative to the car can take place with substantially no damage to the goods, and in addition the force of the resilient means is such that immediately after the shock has been absorbed the resilient means can expand at least part of the way, if not all of the way, to return the goods at least approximately to the condition illustrated in FIG. 1. Of course, part of the energy of the shock, such as that illustrated in FIG. 2, is absorbed by the frictional sliding of the loaded pallets on the floor 48 of the vehicle. The pallets 47 can of course shift along the floor of the vehicle. The extent to which the pressure of the air in the cushion 12 is raised during introduction of air into the cushion 12 will be determined according to the nature of the goods and according to the expected shocks. This pressure will be such that when encountering a shock which will compress the yieldable means somewhat as shown in FIG. 2, this yieldable means will be capable of expanding while shifting the goods at least part of the way back toward its initial location.

It will be noted that with the sructure of the invention the particular goods carried by a particular pallet 47 will reliably be maintained thereon. The walls 7 in particular guarantee that even loose articles which are likely to be located at the top of the stack of articles between a pair of walls 7 will be confined to movement only in the space between such a pair of walls 7 so that they will be reliably maintained on the pallet which carried them when they were initially introduced into the car.

As was pointed out above the compressed air for the yieldable resilient means can be derived from any suitable source such as a suitable tank or from compressed air sources such as are readily available at garages, gas stations, and the like. Moreover, in the case of freight trains, there is in any event a source of compressed air available for the air brakes, and this source of compressed air may be used.

It should be noted that while it is possible, of course, to use mechanical springs as the yieldable resilient means or even a hydraulic structure in combination with such mechanical springs, the pneumatic structure described above is preferred because it is much more convenient and in addition spreads the pressure over a relatively large area whereas mechanical springs, for example, might provide only localized resistance.

It will be understood that each of the elements described above, or two or more together, may also find a useful application in other types of transporting apparatus differing from the types described above.

While the invention has been illustrated and described as embodied in apparatus for transporting goods, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be secured by Letters Patent is:

1. Apparatus for transporting goods, comprising, in combination, outer wall means forming part of a vehicle and defining a goods-receiving chamber; rail means located in said chamber and extending between a pair of opposed ends thereof; a plurality of rigid inner walls supported by said rail means for free movement along the interior of said chamber, said plurality of inner walls being supported exclusively by said rail means and remaining at all times connected only to said rail means so that said plurality of inner walls are at all times free to move relative to said outer wall means; and yieldable, resilient means located between one pair of said inner walls and contacting the same for urging said pair of inner walls apart from each other to compress, between said ends of said chamber, goods located between at least some of said plurality of inner walls, said resilient means being the only agency which resists movement of the goods and said inner walls in said chamber.

2. Apparatus for transporting goods, comprising, in combination, outer wall means forming part of a vehicle and defining a goods-receiving chamber, said outer wall means including a pair of elongated side walls and a pair of opposed end walls; rail means located in said chamber and extending between said end walls thereof substantially parallel to said side walls; a plurality of rigid inner walls each extending between said side walls and being substantially parallel to said end walls, said plurality of inner walls being supported by said rail means for free movement along the interior of said chamber and said plurality of inner walls being supported exclusively by said rail means and remaining at all times connected only to said rail means so that said plurality of inner walls are at all times free to move relative to said outer wall means; and yieldable resilient means located between one pair of said inner walls for urging the latter apart from each other to compress, between said end walls of said chamber, goods located between at least some of said plurality of inner walls, said resilient means being the only agency which resists movement of said goods and said inner walls in said chamber.

3. Apparatus for transporting goods, comprising, in combination, outer wall means forming part of a vehicle and defining a goods-receiving chamber, said outer wall means including a pair of side walls and a pair of end walls respectively located at the ends of and extending between said side walls; rail means located in said chamber and extending between said end walls thereof substantially parallel to said side walls; a plurality of rigid inner walls located in said chamber and having norma positions substantially parallel to said end walls and extending between said side walls; a plurality of support means respectively supporting said plurality of inner walls on said rail means for free movement therealong and said plurality of support means also supporting said plurality of inner walls, respectively, for free swinging movement respectively about axes which are substantially parallel to said side and end walls of said outer wall means, said plurality of inner walls being supported exclusively by said support means on said rail means and remaining at all times connected only by said support means to said rail means, so that said plurality of inner walls are at all times free to move relative to said outer wall means as well as free to swing with respect to said axes, respectively; and yieldable resilient means located between one pair of said inner walls for urging the latter apart from each other to compress, between said end walls of said chamber, goods located between at least some of said plurality of inner walls, said resilient means being the only agency which resists movement of the goods and the inner walls confining said goods in said chamber.

4. Apparatus for transporting goods, comprising, in combination, outer wall means forming part of a vehicle and defining a goods-receiving chamber, said outer wall means including a pair of opposed side walls and a pair of opposed end walls respectively located at the ends of and extending between said side walls; rail means located in said chamber at an upper portion thereof and extending between said end walls while being generally parallel to said side walls; a plurality of support means carried by said rail means for free movement therealong, said plurality of support means being distributed along said rail means; a plurality of rigid inner walls suspended by said plurality of support means, respectively, from said rail means, said support means respectively supporting said plurality of inner walls for free movement along said rail means as well as for swinging movement respectively about a plurality of axes which are substantially parallel to said walls of said outer wall means, said plurality of support means being the only structure which supports and is connected to said plurality of inner walls, respectively, so that said plurality of inner walls are at all times free to move relative to said outer wall means; and yieldable resilient means located between one pair of said inner walls for urging the latter apart from each other to compress, between said end walls of said chamber, goods located between at least some of said plurality of inner walls, said resilient means being the only agency which resists movement of the goods and the inner walls confining said goods in said chamber.

5. Apparatus for transporting goods, comprising, in combination, outer wall means forming part of a vehicle and defining a goods-receiving chamber; rail means located in said chamber and extending between a pair of opposed ends thereof; a plurality of rigid inner walls supported by said rail means for free movement along the interior of said chamber, said plurality of inner walls being supported exclusively by said rail means and remaining at all times connected only to said rail means so that said plurality of inner walls are at all times free to move relative to said outer wall means; and pneumatic means located between a pair of said inner walls for yieldably urging the latter apart from each other to compress, between said ends of said chamber, goods located between at least some of said pluarlity of inner walls, said pneumatic means being the only agency which resists such movement of the goods and the inner walls confining said goods in said chamber.

6. Apparatus for transporting goods, comprising, in combination, outer wall means forming part of a vehicle and defining a goods-receiving chamber; rail means located in said chamber and extending between a pair of opposed ends thereof; a plurality of rigid inner walls supported by said rail means for free movement along the interior of said chamber, said plurality of rigid inner walls being supported exclusively by said rail means and remaining at all times connected only to said rail means so that said plurality of rigid inner walls are at all times free to move relative to said outer wall means; spacing means, including collapsible and expandable bellows means located between and connected to a pair of said rigid inner walls for movement therewith; and pneumatic means located in said bellows means between said pair of rigid inner walls for yieldably urging the latter apart from each to compress between said ends of said chamber, goods located between at least some of said plurality of rigid inner walls, said pneumatic means being the only agency which resists movement of the goods and the inner walls confining said goods in said chamber.

7. Apparatus as recited in claim 6 and wherein said pneumatic means includes an expandable container located in said bellows means, a valve at the exterior of said bellows means, and a tube carrying said valve and extending therefrom to said container for providing communication between said valve and container.

8. Apparatus as recited in claim 6 and wherein said pneumatic means includes an expandable container located in said bellows means, a valve at the exterior of said bellows means, and a tube carrying said valve and extending therefrom to said container for providing communication between said valve and container, said valve having a hollow internally threaded tubular member secured in said tube and having a free upper rim, and an elongated valve housing having a lower end and being formed with a first bore axially of said housing and adapted to receive a valve assembly therein, a second bore transversely of said first bore, and an external circumferential recess, said second bore communicating with said first bore and said circumferential recess, respectively, said housing being further formed with an external flange spaced from said lower end and upwardly of said recess, said lower end of said housing being threaded into said member and said flange sealingly engaging said free upper rim of said member and said recess being received within said member, said bore thus being closed when said housing is threaded to a predetermined extent into said member, air compressed in said container escaping rapidly therefrom when said valve housing is unthreaded from said member, said air escaping through said bore and said recess when said housing is unthreaded to a relatively small extent and said flange closes to engage said rim.

9. Apparatus for transporting goods, comprising, in combination, outer wall means forming part of a vehicle and defining an elongated, goods-receiving chamber; elongated rail means extending longitudinally of said chamber in the interior thereof and along the entire length thereof between a pair of opposed ends thereof; a plurality of rigid inner walls supported by said rail means for free movement along the interior of said chamber, said plurality of rigid inner walls being supported exclusively by said rail means and remaining at all times connected only to said rail means so that said plurality of inner walls are at all times free to move relative to said outer wall means; and yieldable, resilient means located between one pair of said rigid inner walls for urging said pair of inner walls apart from each other to compress, between said ends of said chamber, goods located between at least some of said plurality of inner walls, said resilient means being the only agency which resists movement of the good confined between said at least some inner walls in said chamber.

10. Apparatus for transporting goods, comprising, in combination, outer wall means forming part of a vehicle and defining a goods-receiving chamber, said outer wall means including a pair of side walls and a pair of end walls extending between said side walls at the ends thereof; a pair of rail means located in said chamber, said pair of rail means being substantially parallel to each other and extending substantially parallel to said side walls between said end walls of said outer wall means; a first plurality of rigid inner walls supported by one of said pair of rail means for free movement along the interior of said chamber, and a second plurality of rigid inner walls supported by the other of said rail means for free movement along the interior of said chamber, the plurality of inner walls carried by one of said rail means clearing the plurality of inner walls carried by the other of said rail means when any one of the walls of one of said plurality of inner walls moves past any one of the walls of the other of said plurality of inner walls, all of said inner walls being supported exclusively by said pair of rail means and remaining at all times connected only to said pair of rail means so that all of said inner walls are at all times free to move substantially in unison relative to said outer wall means in response to thrusts transmitted to them by goods confined between adjacent ones of said inner walls; and yieldable resilient means located between and connected to a pair of rigid inner walls of each of said plurality of wall means for urging said pair of inner walls apart from each other to compress, between said end walls of said chamber, goods located between at least some of said plurality of inner walls of each of said first and second plurality of inner walls, said resilient means being the only agency which resists movement of the goods and the confining inner walls in said chamber.

11. Apparatus as recited in claim 10 and wherein each of said rigid inner walls has approximately the configuration of one half the cross section of said chamber extending between said side walls thereof.

12. Apparatus as recited in claim 10 and wherein said pair of rail means are spaced inwardly from said side walls of said outer wall means.

13. Apparatus for transporting goods, comprising, in combination, outer wall means forming part of a vehicle and defining a goods-receiving chamber, said outer wall means including a pair of opposed side walls and a pair of end walls; a plurality of elongated support members distributed along said outer wall means and extending across the latter between said side walls thereof; a pair of rails carried by said plurality of support members, said rails extending substantially parallel to said side walls between said end walls and the distance between each side wall and the rail adjacent thereto being approximately one half the distance between said pair of rails; a first plurality of rigid inner walls supported by one of said rails for free movement therealong and a second plurality of rigid inner walls supported by the other of said rails for free movement therealong, each of said plurality of inner walls clearing the other of said plurality of inner walls during movement along the rail means carrying the same; and a pair of resilient means located between and connected to a pair of each of said plurality of rigid inner walls for urging the latter apart from each other to compress, between the ends of said chamber, goods located between at least some of said plurality of inner walls, said resilient means being the only agency which resists movement of goods and the rigid inner walls confining said goods in said chamber.

14. Apparatus for transporting goods comprising, in combination, outer wall means forming part of a vehicle and defining a goods-receiving chamber, said outer wall means including a pair of side walls and a pair of end walls; a pair of rail means respectively carried by and extending along said side walls of said outer wall means in the interior of said chamber, said rail means each including an upper and a lower rail, each of said rails having an elongated, substantially U-shaped recess therein, the recess in said upper rail being upwardly open and the recess in said lower rail being downwardly open; a plurality of supports carried by each of said rail means for free movement therealong, said supports each including a pair of rollers having respective vertical axes and being respectively received in said recess and respective upper and lower support members operatively connected to said rollers for turning about said axes and connected to one another for forming a support element of triangular configuration and having a free end, said support element extending from each of said rail means inwardly toward the interior of said chamber; and a plurality of rigid inner walls respectively secured to said support elements at a first location adjacent the free ends thereof and a second location inwardly of said first location for free movement along said pair of rail means with the plurality of inner walls carried by the supports connected to one of said rail means clearing the plurality of inner walls carried by the supports connected to the other of said rail means during movement of any of said inner walls along the interior of said chamber, said inner walls being carried exclusively by said supports and being free at all times to move relative to said outer wall means.

References Cited by the Examiner
UNITED STATES PATENTS

| | | | |
|---|---|---|---|
| 1,325,019 | 12/19 | Hussey | 137—226 |
| 2,005,086 | 6/35 | Jones | 105—376 |
| 2,360,029 | 10/44 | Wieden | 105—376 |
| 2,517,823 | 8/50 | Angell | 105—376 |
| 2,764,950 | 10/56 | Finnell | 105—369 |
| 2,856,867 | 10/58 | Dasey | 105—369 |
| 2,971,475 | 2/61 | Weber | 105—29 |
| 3,018,741 | 1/62 | Loomis | 105—376 |

ARTHUR L. LA POINT, *Primary Examiner.*